United States Patent
Takagi et al.

(10) Patent No.: US 11,894,711 B2
(45) Date of Patent: Feb. 6, 2024

(54) IN-VEHICLE WIRELESS ELECTRIC POWER FEEDING DEVICE AND VEHICLE WIRELESS ELECTRIC POWER FEEDING METHOD

(71) Applicant: Mazda Motor Corporation, Hiroshima (JP)

(72) Inventors: Ryohei Takagi, Aki-gun (JP); Maho Tanaka, Aki-gun (JP); Takayoshi Nishijima, Aki-gun (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 431 days.

(21) Appl. No.: 17/207,774

(22) Filed: Mar. 22, 2021

(65) Prior Publication Data

US 2021/0359537 A1    Nov. 18, 2021

(30) Foreign Application Priority Data

May 14, 2020    (JP) .................................. 2020-085195

(51) Int. Cl.
 *H02J 7/00*    (2006.01)
 *H02J 50/80*   (2016.01)
 (Continued)

(52) U.S. Cl.
 CPC ........ *H02J 7/007194* (2020.01); *B60L 1/006* (2013.01); *H02J 50/80* (2016.02); *H02J 50/10* (2016.02); *H02J 2310/22* (2020.01)

(58) Field of Classification Search
 CPC ...... H02J 7/007194; H02J 50/80; H02J 50/10; H02J 2310/22; H02J 7/007192; H02J 7/00045; H02J 7/00309; B60L 1/006
 See application file for complete search history.

(56) References Cited

U.S. PATENT DOCUMENTS 10,879,745 B2 * 12/2020 Heresztyn ............... H02J 50/80
2011/0071597 A1    3/2011 Aghassian
(Continued)

FOREIGN PATENT DOCUMENTS

EP    3404796 A1    11/2018
JP    2001-258182 A    9/2001
(Continued)

*Primary Examiner* — Stacy Whitmore
(74) *Attorney, Agent, or Firm* — XSENSUS LLP

(57) ABSTRACT

An in-vehicle wireless electric power feeding device is used in a vehicle, wirelessly performs electric power feeding to an electric power reception device (e.g., smartphone), and stops the electric power feeding at a temperature not lower than or higher than a predetermined first temperature threshold. The in-vehicle wireless electric power feeding device SD includes an electric power transmission unit that wirelessly performs electric power feeding to the electric power reception device, a temperature measurement unit that measures the temperature of the electric power transmission unit, and a control unit that controls the electric power transmission unit so that the electric power transmission unit wirelessly performs electric power feeding to the electric power reception device when the temperature measured by the temperature measurement unit at startup is not higher than or lower than a predetermined second temperature threshold higher than the first temperature threshold.

18 Claims, 7 Drawing Sheets

(51) Int. Cl.
*B60L 1/00* (2006.01)
*H02J 50/10* (2016.01)

(56) References Cited

U.S. PATENT DOCUMENTS

| | | | |
|---|---|---|---|
| 2014/0125277 A1 | 5/2014 | Van Wiemeersch et al. | |
| 2016/0004956 A1* | 1/2016 | Reynolds | G07C 3/00 377/15 |
| 2016/0118808 A1* | 4/2016 | Van Wageningen | H02J 50/12 307/104 |
| 2017/0085116 A1* | 3/2017 | Tsao | H02J 7/04 |
| 2018/0205257 A1* | 7/2018 | Kwon | H02J 50/12 |
| 2019/0207411 A1* | 7/2019 | Kim | H01F 27/38 |
| 2020/0343765 A1* | 10/2020 | Kwon | H02J 50/80 |

FOREIGN PATENT DOCUMENTS

| | | | | |
|---|---|---|---|---|
| JP | 2008-45845 A | | 2/2008 | |
| WO | WO-2018212499 A1 | * | 11/2018 | H02J 50/80 |

* cited by examiner

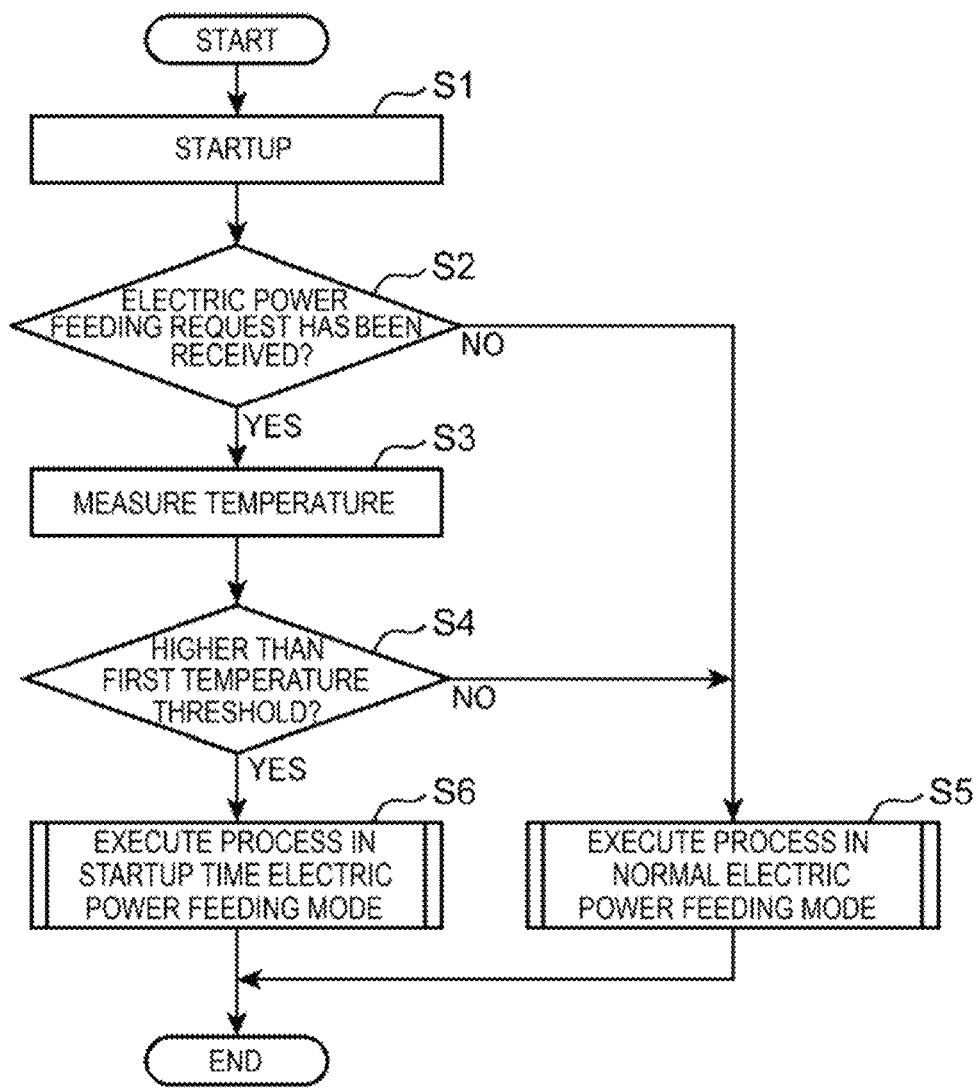

IN-VEHICLE WIRELESS ELECTRIC POWER FEEDING DEVICE AND VEHICLE WIRELESS ELECTRIC POWER FEEDING METHOD

CROSS-REFERENCE TO RELATED APPLICATION

This application claims priority from Japanese Application No. 2020-085195, filed on May 14, 2020, the contents of which are incorporated by reference herein in its entirety.

TECHNICAL FIELD

The present disclosure relates to an in-vehicle wireless electric power feeding device and a vehicle wireless electric power feeding method that are used in a vehicle and wirelessly performs electric power feeding to an electric power reception device.

BACKGROUND

Wireless electric power feeding systems including an electric power reception device that consumes electric power and a wireless electric power feeding device that wirelessly performs electric power feeding to the electric power reception device have been adopted in various devices and widely used. Such a wireless electric power feeding system is disclosed in, for example, patent document 1 and patent document 2.

An electric power transmission device disclosed in patent document 1 wirelessly transmits electric power to an electric power reception device and includes detection means that detects the temperature inside or around the electric power transmission device, setting means that sets the value of electric power that can be output by the electric power reception device on the condition that the temperature detected by the detection means is not higher than a predetermined temperature when electric power is transmitted to the electric power reception device, and electric power transmission means that transmits electric power to the electric power reception device based on the value of electric power set by the setting means.

An electric power transfer device disclosed in patent document 2 includes a main body having a first coil supplied with electric power from a commercial power source and a terminal having a second coil subjected to electromagnetic induction connection with the first coil, in which the main body wirelessly supplies electric power to the terminal via the first coil and the second coil. The main body has an excessive temperature rise prevention device that automatically stops the supply of electric power to the terminal when a temperature not lower than a predetermined value is detected.

[Patent document 1] JP-A-2018-045845
[Patent document 2] JP-A-2001-258182

SUMMARY

By the way, the electric power transmission device disclosed in patent document 1 is a device that transmits electric power to the electric power reception device based on the value of electric power that can be output by the electric power reception device on the condition that a predetermined temperature is not exceeded. However, in the first place, when the predetermined temperature is exceeded at the start of transmission of electric power, electric power cannot be transmitted. Similarly, the electric power transfer device disclosed in patent document 2 cannot transmit electric power because it automatically stops the supply of electric power to the terminal when a temperature not lower than a predetermined temperature is detected. Accordingly, when these devices are used in vehicles parked in an environment in which the temperature rises (for example, an environment exposed to sunlight such as under the scorching sun), since the predetermined temperature is exceeded at the start of the vehicle, the wireless electric power feeding system cannot feed electric power to the electric power reception device. In these devices, since the wireless electric power feeding system cannot feed electric power to the electric power reception device until the temperature around the wireless electric power feeding system is lowered by, for example, outside air or a car air-conditioner, the electric power feeding time during a travel is reduced. In some cases, the vehicle may arrive at the destination before the wireless electric power feeding system starts electric power feeding to the electric power reception device after the temperature drops below the predetermined temperature and the devices may not perform electric power feeding at all.

The present disclosure addresses the above situation with an object of providing an in-vehicle wireless electric power feeding device and a vehicle wireless electric power feeding method that can improve the opportunity for electric power feeding at startup.

The present disclosure describes that the above object is achieved as described further herein. That is, according to an aspect of the present disclosure, there is provided an in-vehicle wireless electric power feeding device that is used in a vehicle, wirelessly performs electric power feeding to an electric power reception device, and stops the electric power feeding at a temperature not lower than or higher than a predetermined first temperature threshold, the in-vehicle wireless electric power feeding device including an electric power transmission unit configured to wirelessly perform electric power feeding to the electric power reception device; a temperature measurement unit configured to measure a temperature of the electric power transmission unit; and a control unit configured to control the electric power transmission unit so that the electric power transmission unit wirelessly performs electric power feeding to the electric power reception device when the temperature measured by the temperature measurement unit at startup is not higher than or lower than a predetermined second temperature threshold higher than the first temperature threshold. In one aspect, in the in-vehicle wireless electric power feeding device described above, the first temperature threshold is a temperature (set from the viewpoint of ensuring human safety) under which a person can safely use the in-vehicle wireless electric power feeding device. In one aspect, in the in-vehicle wireless electric power feeding device described above, the first temperature threshold is a temperature at or above which a person feels hot when the person comes into contact with the in-vehicle wireless electric power feeding device. In one aspect, in the in-vehicle wireless electric power feeding device described above, the first temperature threshold is a predetermined temperature within the range of 45° C. to 50° C. In one aspect, in the in-vehicle wireless electric power feeding device described above, the control unit controls the electric power transmission unit so that the electric power transmission unit wirelessly performs electric power feeding to the electric power reception device when the temperature measured by the temperature measurement unit is not higher than or lower than the second temperature threshold higher than the first temperature threshold at the start of the electric power feeding until the temperature measured by the temperature measurement unit becomes lower than or not higher than the first temperature threshold for the first time after startup.

Normally, the first temperature threshold is set to the temperature at which a person feels hot to ensure human safety and is set lower than a guaranteed operating temperature under which the operation of the in-vehicle wireless electric power feeding device is guaranteed. Accordingly, electric power feeding can be performed even at a temperature not lower than the first temperature threshold. In addition, when the vehicle is parked in an environment in which the temperature rises, since the occupant empirically recognizes (predicts) that the vehicle is hot in starting the vehicle and the electric power reception device is placed on the in-vehicle wireless electric power feeding device based on the recognition, it is thought that electric power feeding may be performed at a temperature not lower than the first temperature threshold. Since the in-vehicle wireless electric power feeding device controls the electric power transmission unit so that the electric power transmission unit wirelessly performs electric power feeding to the electric power reception device when the temperature measured by the temperature measurement unit at startup is not higher than or lower than the predetermined second temperature threshold higher than the first temperature threshold by taking advantage of this circumstance, the opportunity for electric power feeding can be improved at the startup of the in-vehicle wireless electric power feeding device.

In the in-vehicle wireless electric power feeding device according to another aspect, the control unit controls the electric power transmission unit so that the electric power transmission unit does not wirelessly perform electric power feeding to the electric power reception device when the temperature measured by the temperature measurement unit at the startup is higher than or not lower than the predetermined second temperature threshold. In one aspect, in the in-vehicle wireless electric power feeding device described above, when electric power feeding to the electric power reception device is wirelessly performed at the startup, the control unit controls the electric power transmission unit so that the electric power transmission unit continues electric power feeding after the temperature measured by the temperature measurement unit becomes lower than or not higher than a predetermined third temperature threshold lower than the first temperature threshold during the electric power feeding or the electric power transmission unit stops the electric power feeding when the temperature measured by the temperature measurement unit becomes higher than or not lower than the first temperature threshold during the electric power feeding and controls the electric power transmission unit so that the electric power transmission unit resumes the electric power feeding when the temperature measured by the temperature measurement unit becomes lower than or not higher than the third temperature threshold when electric power feeding is stopped even though the electric power feeding is required. In one aspect, in the in-vehicle wireless electric power feeding device described above, when electric power feeding to the electric power reception device is not wirelessly performed at the startup, the control unit controls the electric power transmission unit so that the electric power transmission unit starts the electric power feeding when the temperature measured by the temperature measurement unit becomes lower than or not higher than the third temperature threshold and the electric power transmission unit stops the electric power feeding when the temperature measured by the temperature measurement unit becomes higher than or not lower than the first temperature threshold and controls the electric power transmission unit so that a electric power transmission unit resumes the electric power feeding when the temperature measured by the temperature measurement unit becomes lower than or not higher than the third temperature threshold while the electric power feeding is stopped even though the electric power feeding is required.

The in-vehicle wireless electric power feeding device described above wirelessly controls the electric power transmission unit so that the electric power transmission unit does not wirelessly perform electric power feeding to the electric power reception device when the temperature measured by the temperature measurement unit at the startup is higher than or not lower than the second temperature threshold, thereby enabling appropriate use.

In the in-vehicle wireless electric power feeding device according to another aspect, the second temperature threshold is a guaranteed operating temperature under which an operation of the in-vehicle wireless electric power feeding device is guaranteed. In one aspect, in the in-vehicle wireless electric power feeding device described above, the second temperature threshold is a predetermined temperature within the range of 85° C. to 100° C.

The in-vehicle wireless electric power feeding device described above can perform electric power feeding appropriately in the guaranteed operation since the second temperature threshold is the guaranteed operating temperature under which the operation of the in-vehicle wireless electric power feeding device is guaranteed.

In the in-vehicle wireless electric power feeding device according to another aspect, when the electric power transmission unit wirelessly performs electric power feeding to the electric power reception device at the startup, the control unit controls the electric power transmission unit so that the electric power transmission unit wirelessly performs electric power feeding to the electric power reception device with an electric power value that is based on a difference between the second temperature threshold and the temperature measured by the temperature measurement unit. In one aspect, in the in-vehicle wireless electric power feeding device described above, the control unit sets the electric power value that is based on the difference so that the smaller the difference, the smaller the electric power value.

The temperature of the in-vehicle wireless electric power feeding device generally rises by wireless electric power feeding and the rate of the temperature rise per unit time depends on the magnitude of the electric power value of electric power feeding. Since the in-vehicle wireless electric power feeding device controls the electric power transmission unit so that the electric power transmission unit wirelessly performs electric power feeding to the electric power reception device with the electric power value that is based on the difference between the second temperature threshold and the temperature measured by the temperature measurement unit, the time of electric power feeding can be further prolonged and the amount of electric power feeding can be further increased.

According to an aspect of the present disclosure, there is provided a vehicle wireless electric power feeding method that is used in a vehicle, wirelessly performs electric power feeding to an electric power reception device, and stops the electric power feeding at a temperature not lower than or higher than a predetermined first temperature threshold, the vehicle wireless electric power feeding method including a temperature measurement step of measuring a temperature of an electric power transmission unit; and an electric power feeding step of wirelessly performing electric power feeding to the electric power reception device when the temperature measured in the temperature measurement step at startup is not higher than or less than a predetermined second temperature threshold higher than the first temperature threshold.

Since the vehicle wireless electric power feeding method described above wirelessly performs electric power feeding to the electric power reception device when the temperature measured by the temperature measurement step at startup is not higher than or lower than the predetermined second temperature threshold higher than the first temperature threshold, the opportunity for electric power feeding can be improved at startup.

The in-vehicle wireless electric power feeding device and the vehicle wireless electric power feeding method according to the present disclosure can improve the opportunity for electric power feeding at startup.

BRIEF DESCRIPTION OF THE DRAWINGS

FIG. 2 is a flowchart illustrating the operation of the in-vehicle wireless electric power feeding device.

DETAILED DESCRIPTION

Figure 1A:
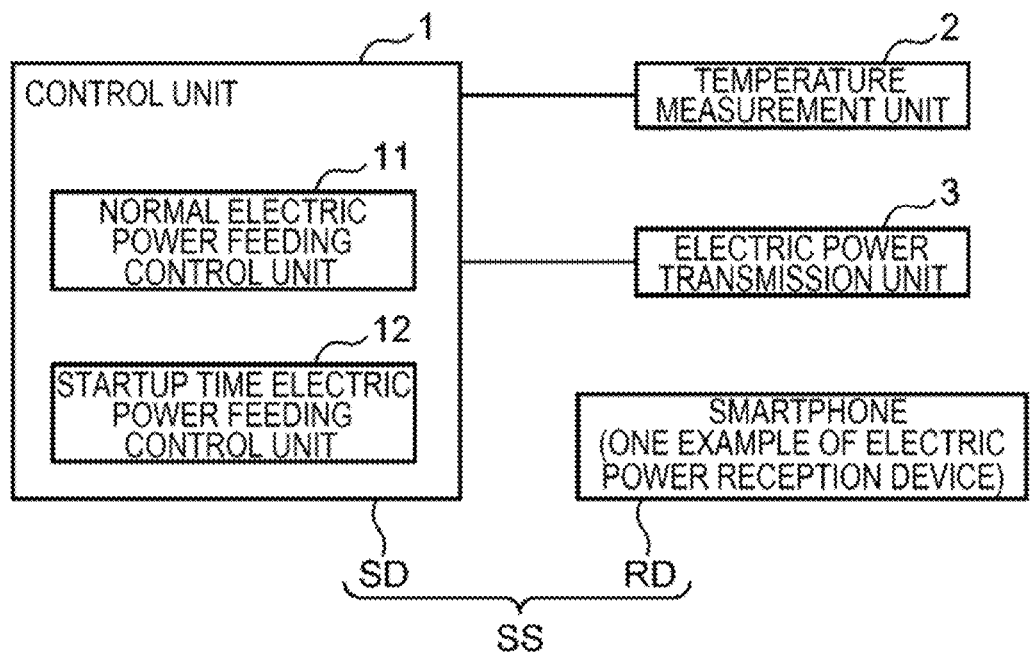
FIG. 1A is a block diagram illustrating the structure of the in-vehicle wireless electric power feeding system according to an embodiment.

One or more embodiments of the present disclosure will be described below with reference to the drawings. However, the scope of the present disclosure is not limited to the disclosed embodiments. It should be noted here that components denoted by the same reference numerals in the figures are identical and descriptions thereof will be omitted as appropriate. In this specification, collective components are indicated by reference numerals without subscripts and individual components are indicated by reference numerals with subscripts.

The in-vehicle wireless electric power feeding device according to an embodiment is used in a vehicle, wirelessly performs electric power feeding to an electric power reception device, and stops the electric power feeding at a temperature not lower than or higher than a predetermined first temperature threshold. Then, in the embodiment, the in-vehicle wireless electric power feeding device includes an electric power transmission unit that wirelessly performs electric power feeding to the electric power reception device, a temperature measurement unit that measures the temperature of the electric power transmission unit, and a control unit that controls the electric power transmission unit so that the electric power transmission unit wirelessly performs electric power feeding to the electric power reception device when the temperature measured by the temperature measurement unit at startup is not higher than or lower than a second temperature threshold that is higher than the first temperature threshold. The electric power reception device may be any device that can wirelessly receive electric power from the in-vehicle wireless electric power feeding device. That is, the electric power reception device may be an electric device that is wirelessly supplied with electric power and directly consumes the supplied electric power and may be an electric device that stores the supplied electric power in a storage element (such as, for example, a capacitor, an electric double-layer capacitor, or a rechargeable battery) and then indirectly consumes the stored electric power. The following uses a smartphone having a rechargeable battery to be charged as one example of the electric power reception device, and more specifically describes the in-vehicle wireless electric power feeding device in the in-vehicle wireless electric power feeding system including the smartphone and the in-vehicle wireless electric power feeding device.

Figure 1B:
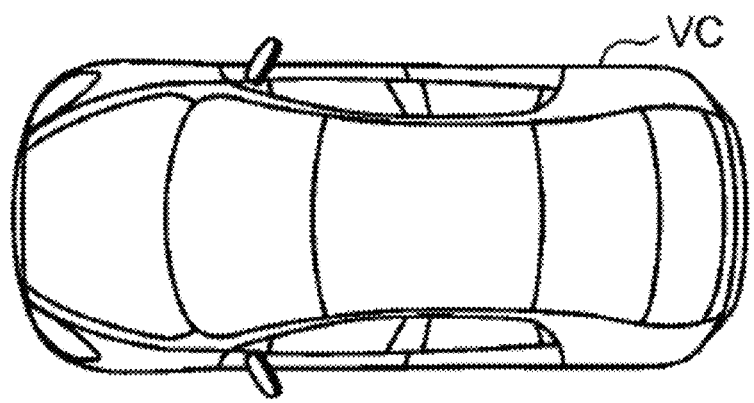
FIG. 1B is a diagram illustrating one example of the vehicle according to an embodiment.

FIGS. 1A and 1B are diagrams used to describe the in-vehicle wireless electric power feeding system including the in-vehicle wireless electric power feeding device according to the embodiment. FIG. 1A is a block diagram illustrating the structure of the in-vehicle wireless electric power feeding system and FIG. 1B is a diagram illustrating one example of the vehicle.

An in-vehicle wireless electric power feeding system SS according to the embodiment includes, for example, a smartphone (one example of the electric power reception device) RD and an in-vehicle wireless electric power feeding device SD, as illustrated in FIG. 1A.

The smartphone RD is an electric device including a wireless electric power reception function that wirelessly receives electric power, a charge and discharge function for charging and discharging of the received electric power, a mobile communication function that performs mobile communication, and an information processing function that performs predetermined information processing, such as, for example, a browser, a mailer, game software, and video playback software.

The wireless electric power feeding method that wirelessly performs electric power feeding is a method that transmits electric power without using direct connection means (that is, wirelessly) such as metal contacts or connectors, and includes various types such as, for example, a magnetic field coupling type (electromagnetic inducing type or magnetic field resonance type), an electric field coupling type, a microwave type, and an ultrasonic type. In the embodiment, the wireless electric power feeding method may be any method that raises the temperature of the in-vehicle wireless electric power feeding device SD by wireless electric power feeding, and the wireless electric power feeding method will be described using the magnetic field coupling type as one example. This magnetic field coupling type may be any method among various methods and will be described using the Qi standard, which is an international standard for wireless electric power feeding and is adopted in many smartphones. The Qi standard is the standard established by the Wireless Power Consortium to improve situations in which a large number of wireless electric power feeding methods have been originally developed and there is no compatibility between devices. The Qi standard not only provides electric power feeding of the magnetic field coupling type, but also performs unidirectional communication from the electric power reception side (electric power reception device) to the electric power transmission side (wireless electric power feeding device). This unidirectional communication adopts binary ASK (amplitude shift keying) that makes changes in loads on the electric power reception side. In this unidirectional communication, an electric power feeding request, the electric power value of electric power feeding, the completion of electric power feeding, and the like are transmitted from the electric power reception side to the electric power transmission side, and the electric power reception side transmits communication signals (packets) periodically at predetermined time intervals while receiving electric power. This enables the power transmission side to determine whether the object placed on the power transmission surface is an electric device compliant with the Qi standard or other foreign matter.

Therefore, the smartphone RD includes, as the wireless electric power reception function, an electric power reception coil (electric power reception unit) around which a linear conductor is wound, an electric power reception communication circuit that is connected to the electric power reception coil and compliant with the Qi standard, a rechargeable battery for charging and discharging of electric power, and a charging circuit that is connected to the electric power reception coil and the rechargeable battery, rectifies the electric power received by the electric power reception coil, and charges the rechargeable battery with the rectified electric power. The electric power with which the rechargeable battery is charged is used to perform the mobile communication function and the information processing function. The smartphone RD uses a charge request, the electric power value of charging, and the completion of charging as the electric power feeding request, the electric power value of electric power feeding, and the completion of electric power feeding, respectively.

As described above, the in-vehicle wireless electric power feeding device SD is used in a vehicle, wirelessly performs electric power feeding to the smartphone RD, which is one example of the electric power reception device, and stops the electric power feeding at a temperature not lower than the preset predetermined first temperature threshold (or higher than the first temperature threshold). The in-vehicle wireless electric power feeding device SD includes, for example, a control unit 1, a temperature measurement unit 2, and an electric power transmission unit 3 as illustrated in FIG. 1A.

The in-vehicle wireless electric power feeding device SD may be used in any vehicle such as an automobile, a bus, a truck, or a train, and is mounted and used in, for example, a passenger vehicle VC illustrated in FIG. 1B. In this passenger vehicle VC, the electric power transmission unit 3 of the in-vehicle wireless electric power feeding device SD is placed, for example, on the bottom of the recess of an accessory case provided in the center console disposed between the driver's seat and the passenger's seat. The electric power transmission unit 3 is provided in the bottom plate forming the bottom or on the back surface of the bottom plate. By providing the electric power transmission unit 3 in the recess of the accessory case, even if the passenger vehicle VC shakes, the smartphone RD is prevented from flying out of the accessory case because the smartphone RD is in the recess of the accessory case during electric power feeding, and the in-vehicle wireless electric power feeding device SD can continue electric power feeding.

The electric power transmission unit 3 is a device that is connected to the control unit 1 and wirelessly feeds electric power from a power source to the electric power reception coil of the smartphone RD subjected to magnetic field coupling under the control of the control unit 1 and the electric power transmission unit 3 is, for example, a power transmission coil around which a linear conductor is wound. The electric power transmission coil may be formed, for example, by winding an insulation-coated conductor wire (such as, for example, a copper wire) or may be formed, for example, by etching a conductor layer (for example, a metal layer such as copper) formed on a substrate in a coil shape.

The temperature measurement unit 2 is a device that is connected to the control unit 1 and measures the temperature of the electric power transmission unit 3 under the control of the control unit 1. The temperature measurement unit 2 includes, for example, a thermistor and a peripheral circuit thereof that are disposed in or around the electric power transmission unit 3.

The control unit 1 controls the individual units 2 and 3 of the in-vehicle wireless electric power feeding device SD according to the functions thereof and controls the wireless electric power feeding to the smartphone RD. The control unit 1 includes, for example, a microcomputer. Alternatively, the control unit 1 may be a circuit including individual components such as transistor, capacitor, and resistance elements.

When the control unit 1 includes a microcomputer, the microcomputer stores various types of predetermined programs and various types of predetermined data. The various types of predetermined programs include, for example, control programs that control the individual units 2 and 3 of the in-vehicle wireless electric power feeding device SD according to the functions of these units, electric power feeding control programs that control the wireless electric power feeding to the smartphone RD, and the like. The electric power feeding control programs include a normal electric power feeding control program that processes a normal electric power feeding mode described later, and a startup time electric power feeding control program that processes a startup time electric power feeding mode described later. The various types of predetermined data include, for example, data necessary to execute the individual programs, such as the first to third temperature thresholds described later.

The control unit 1 has the startup time electric power feeding mode and the normal electric power feeding mode for wirelessly performing electric power feeding to the smartphone RD and functionally has a normal electric power feeding control unit 11 and a startup time electric power feeding control unit 12 corresponding to these modes.

The normal electric power feeding control unit 11 executes the normal electric power feeding mode in which the electric power transmission unit 3 wirelessly performs electric power feeding to the smartphone RD and stops the electric power feeding at a temperature not lower than the preset predetermined first temperature threshold (or higher than the first temperature threshold). In this normal electric power feeding mode, more specifically, the normal electric power feeding control unit 11 controls the electric power transmission unit 3 so that the electric power transmission unit 3 starts the electric power feeding when the temperature measured by the temperature measurement unit 2 at the start of electric power feeding is not higher than the first temperature threshold (or lower than the first temperature threshold), controls the electric power transmission unit 3 so that the electric power transmission unit 3 stops the electric power feeding when the temperature measured by the temperature measurement unit 2 during the electric power feeding becomes higher than the first temperature threshold (or becomes not lower than the first temperature threshold), and controls the electric power transmission unit 3 so that the electric power transmission unit 3 starts (resumes) the electric power feeding when the temperature measured by the temperature measurement unit 2 while the electric power feeding is stopped even though the electric power feeding is required becomes lower than the predetermined third temperature threshold (or becomes not higher than the predetermined third temperature threshold) lower than the first temperature threshold.

The first and third temperature thresholds are set as appropriate from, for example, a practical point of view. For example, the first temperature threshold is a temperature (temperature set from the viewpoint of ensuring the safety of a person) under which a person can safely use the in-vehicle wireless electric power feeding device SD. Alternatively, for example, the first temperature threshold is a temperature at or above which a person feels hot when the person comes into contact with the in-vehicle wireless electric power feeding device SD. Alternatively, the first temperature threshold is a predetermined temperature within the range of 45° C. to 50° C. The third temperature threshold is a temperature, for example, 5° C. or 10° C. lower than the first temperature threshold.

The startup time electric power feeding control unit 12 executes the startup time electric power feeding mode in which the electric power transmission unit 3 is controlled so that the electric power transmission unit 3 wirelessly performs electric power feeding to the smartphone RD when the temperature measured by the temperature measurement unit 2 at the startup of the in-vehicle wireless electric power feeding device SD is not higher than the preset predetermined second temperature threshold (or lower than the second temperature threshold) higher than the first temperature threshold. In the embodiment, when wirelessly performing electric power feeding to the smartphone RD at the startup, the startup time electric power feeding control unit 12 controls the electric power transmission unit 3 so that the electric power transmission unit 3 wirelessly performs electric power feeding to the smartphone RD with an electric power value that is based on the difference between the second temperature threshold and the temperature measured by the temperature measurement unit 2. In one aspect, the startup time electric power feeding control unit 12 sets the electric power value that is based on the difference so that the smaller the difference, the smaller the electric power value. In this startup time electric power feeding mode, the startup time electric power feeding control unit 12 further controls the electric power transmission unit 3 so that the electric power transmission unit 3 does not wirelessly perform electric power feeding to the smartphone RD when the temperature measured by the temperature measurement unit 2 at the startup is higher than the second temperature threshold (or not lower than the second temperature threshold).

Then, when electric power feeding to the smartphone RD is wirelessly performed at the startup, the control unit 1 controls the electric power transmission unit 3 so that the electric power transmission unit 3 continues the electric power feeding after the temperature measured by the temperature measurement unit 2 becomes lower than the third temperature threshold (or becomes not higher than the third temperature threshold) during the electric power feeding or so that the electric power transmission unit 3 stops the electric power feeding when the temperature measured by the temperature measurement unit 2 during the electric power feeding becomes higher than the first temperature threshold (or becomes not lower than the first temperature threshold) and controls the electric power transmission unit 3 so that the electric power transmission unit 3 resumes the electric power feeding when the temperature measured by the temperature measurement unit 2 becomes lower than the preset predetermined third temperature threshold (or becomes not higher than the third temperature threshold) which is lower than the first temperature threshold while the electric power feeding is stopped even though the electric power feeding is required. That is, when electric power feeding to the smartphone RD is wirelessly performed at the startup, if the temperature measured by the temperature measurement unit 2 during the electric power feeding becomes lower than the third temperature threshold (or becomes not higher than the third temperature threshold), the control unit 1 completes the execution of the startup time electric power feeding mode by the startup time electric power feeding control unit 12 and starts and executes the normal electric power feeding mode by the normal electric power feeding control unit 11.

When electric power feeding to the smartphone RD is not performed wirelessly at the startup, the control unit 1 controls the electric power transmission unit 3 so that the electric power transmission unit 3 starts the electric power feeding when the temperature measured by the temperature measurement unit 2 becomes lower than the third temperature threshold (or becomes not higher than the third temperature threshold) or so that the electric power transmission unit 3 stops the electric power feeding when the temperature measured by the temperature measurement unit 2 becomes higher than the first temperature threshold (or becomes not lower than the first temperature threshold) and controls the electric power transmission unit 3 so that the electric power transmission unit 3 resumes the electric power feeding when the temperature measured by the temperature measurement unit 2 becomes lower than the third temperature threshold (or becomes not higher than the third temperature threshold) while the electric power feeding is stopped even though the electric power feeding is required. That is, when electric power feeding to the smartphone RD is not wirelessly performed at the startup, the control unit 1 completes the execution of the startup time electric power feeding mode by the startup time electric power feeding control unit 12 and starts and executes the normal electric power feeding mode by the normal electric power feeding control unit 11.

The second temperature threshold is set as appropriate from, for example, a practical point of view. For example, the second temperature threshold is the guaranteed operating temperature under which the operation of the in-vehicle wireless electric power feeding device SD is guaranteed. Alternatively, the second temperature threshold is a predetermined temperature within the range of 85° C. to 100° C. The relationship of individual temperature thresholds is as follows: (second temperature threshold)>(first temperature threshold)>(third temperature threshold).

Figure 3:
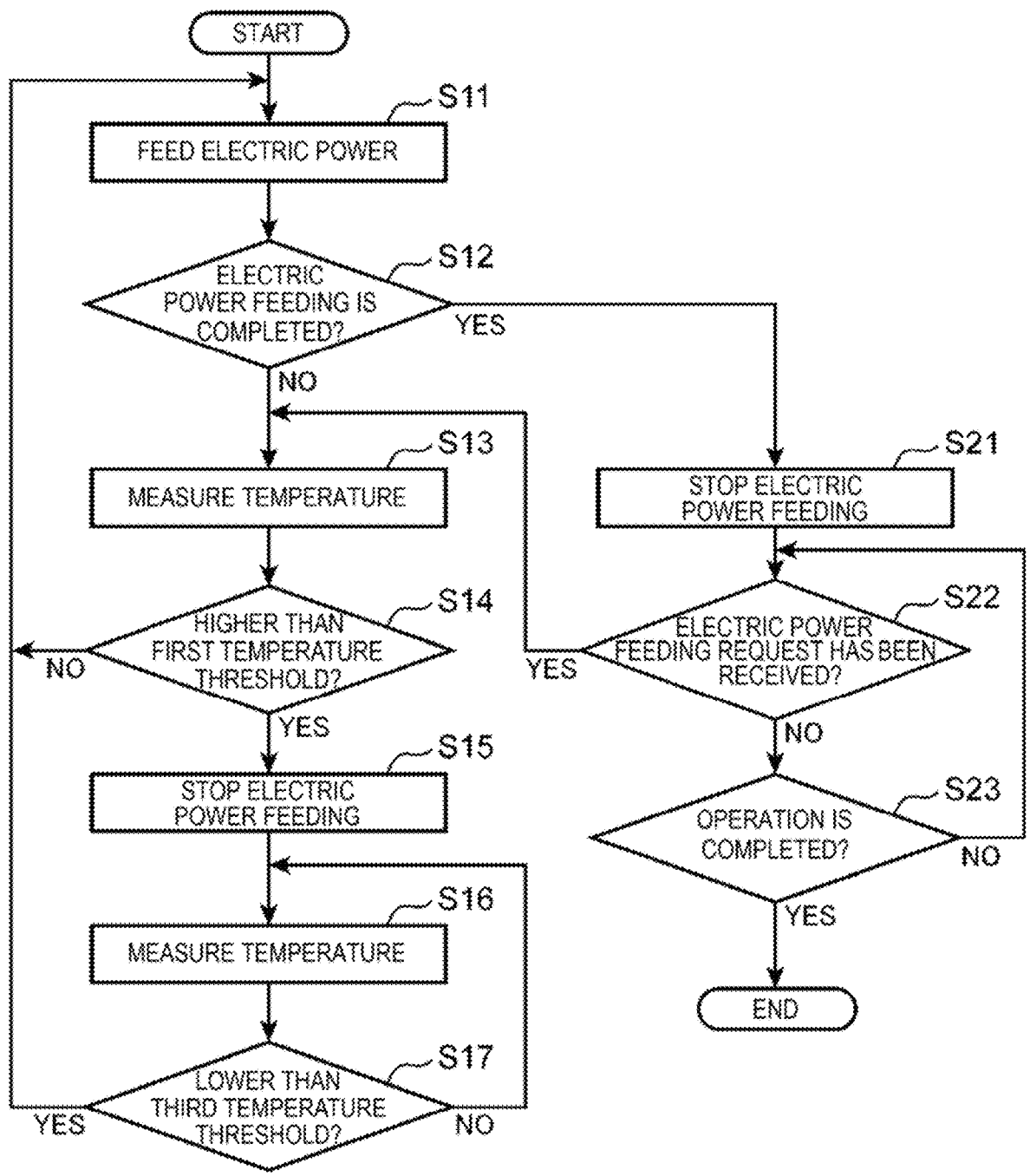
FIG. 3 is a flowchart illustrating the processing in a normal electric power feeding mode illustrated in FIG. 2.
Figure 4:
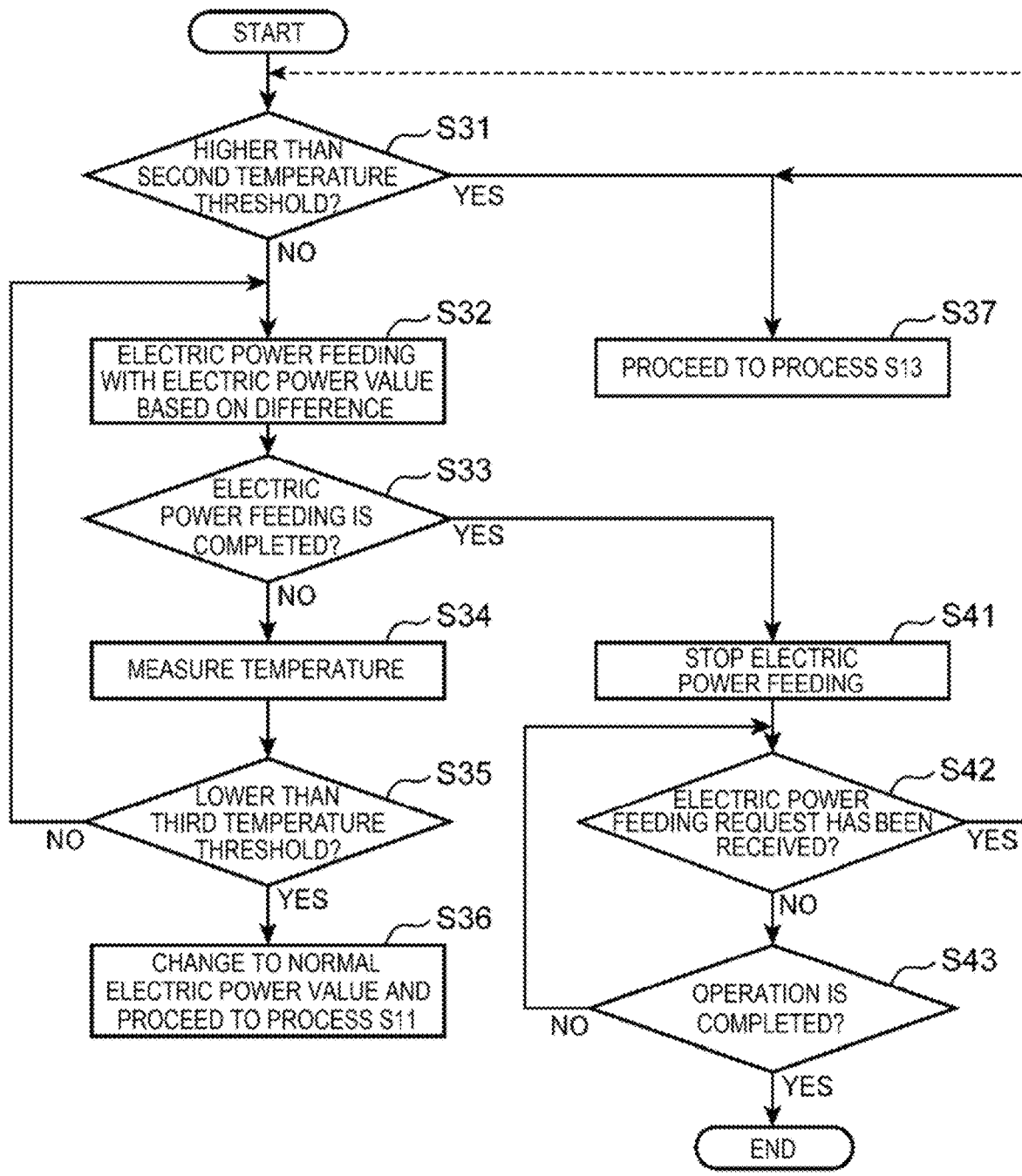
FIG. 4 is a flowchart illustrating the processing in a startup time electric power feeding mode illustrated in FIG. 2.

Next, the operation of the embodiment will be described. FIG. 2 is a flowchart illustrating the operation of the in-vehicle wireless electric power feeding device. FIG. 3 is a flowchart illustrating the process in the normal electric power feeding mode illustrated in FIG. 2. FIG. 4 is a flowchart illustrating the process in the startup time electric power feeding mode illustrated in FIG. 2.

In the in-vehicle wireless electric power feeding device SD of the in-vehicle wireless electric power feeding system SS with the structure described above, when the passenger vehicle VC starts up in FIG. 2, the in-vehicle wireless electric power feeding device SD starts up accordingly and performs the initialization of required units (S1).

Next, the in-vehicle wireless electric power feeding device SD causes the control unit 1 to determine whether an electric power feeding request has been received (S2). More specifically, the control unit 1 determines whether the electric power transmission unit 3 has received a communication signal (charge request signal) containing a charge request from the smartphone RD. As a result of this determination, when the charge request signal has been received, the control unit 1 determines that the electric power feeding request is present (Yes) and then executes process S3. In contrast, as a result of the determination, when the electric power transmission unit 3 has not received the charge request signal, the control unit 1 determines that the electric power feeding request is not present (No), executes the process in the normal electric power feeding mode described later (S5), and completes this process.

For example, the occupant gets onto the passenger vehicle VC and puts the smartphone RD into the recess of the accessory case. The smartphone RD monitors the remaining charge amount of the rechargeable battery and, when the remaining charge amount is not higher than a preset predetermined threshold (remaining amount threshold) below which charging is required, the smartphone RD sends the charge request signal from the electric power reception coil. The charge request signal also contains the electric power value of charging (electric power value of electric power feeding).

In process S3 described above, the in-vehicle wireless electric power feeding device SD causes the control unit 1 to measure the temperature of the electric power transmission unit 3 via the temperature measurement unit 2. The temperature of the electric power transmission unit 3 measured by this temperature measurement unit 2 is output from the temperature measurement unit 2 to the control unit 1 and the control unit 1 obtains the temperature of the electric power transmission unit 3.

Following process S3 described above, the in-vehicle wireless electric power feeding device SD causes the control unit 1 to determine whether the temperature of the electric power transmission unit 3 measured by the temperature measurement unit 2 at this startup is higher than (or not lower than the first temperature threshold) the first temperature threshold (S4). As a result of this determination, when the temperature of the electric power transmission unit 3 is higher than the first temperature threshold (or the temperature of the electric power transmission unit 3 is not lower than the first temperature threshold) (Yes), the control unit 1 executes the process in the startup time electric power feeding mode described later (S6) and completes this process. In contrast, as a result of the determination, when the temperature of the electric power transmission unit 3 is not higher than the first temperature threshold (or when the temperature of the electric power transmission unit 3 is lower than the first temperature threshold) (No), that is, when the temperature of the electric power transmission unit 3 is not higher than the first temperature threshold (or when the temperature of the electric power transmission unit 3 is lower than the first temperature threshold) (No), the control unit 1 executes the process in the normal electric power feeding mode described later (S5) and completes this process.

Next, process S5 in the normal electric power feeding mode will be described.

In process S5 in this normal electric power feeding mode, in FIG. 3, according to the electric power feeding request (charge request) determined in process S2 described above in FIG. 2, the in-vehicle wireless electric power feeding device SD first controls the electric power transmission unit 3 so that the electric power transmission unit 3 wirelessly performs electric power feeding to the smartphone RD with the electric power value of charging (electric power value of electric power feeding) contained in the charge request signal via the normal electric power feeding control unit 11 of the control unit 1 (S11). As a result, the electric power transmission unit 3 wirelessly performs electric power feeding to the smartphone RD.

Next, the in-vehicle wireless electric power feeding device SD causes the normal electric power feeding control unit 11 to determine whether the completion of electric power feeding has been received (S12). More specifically, the normal electric power feeding control unit 11 determines whether the electric power transmission unit 3 has received a communication signal (charging completion signal) containing the completion of charging from the smartphone RD. As a result of this determination, when the charging completion signal has been received, the normal electric power feeding control unit 11 determines that the completion of electric power feeding is present (Yes) and then executes process S21. In contrast, as a result of the determination, when the charging completion signal has not been received, the normal electric power feeding control unit 11 determines that the completion of electric power feeding is not present (No) and then executes process S13.

In process S13, the in-vehicle wireless electric power feeding device SD causes the temperature measurement unit 2 to measure the temperature of the electric power transmission unit 3 via the normal electric power feeding control unit 11. The temperature of the electric power transmission unit 3 measured by this temperature measurement unit 2 is output from the temperature measurement unit 2 to the control unit 1 and the normal electric power feeding control unit 11 obtains the temperature of the electric power transmission unit 3. In process S13, the normal electric power feeding control unit 11 may measure the temperature of the electric power transmission unit 3 via the temperature measurement unit 2 after executing the so-called wait process in which execution of the process is waited for a predetermined time (waiting time). As a result, the in-vehicle wireless electric power feeding device SD can wait for temperature changes in the electric power transmission unit 3 for the period substantially identical to the waiting time.

Following process S13 described above, the in-vehicle wireless electric power feeding device SD causes the normal electric power feeding control unit 11 to determine whether the temperature of the electric power transmission unit 3 measured by the temperature measurement unit 2 in process S13 becomes higher than the first temperature threshold (or becomes not lower than the first temperature threshold) (S14). As a result of this determination, when the temperature of the electric power transmission unit 3 becomes higher than the first temperature threshold (or the temperature of the electric power transmission unit 3 becomes not lower than the first temperature threshold) (Yes), the normal electric power feeding control unit 11 then executes process S15. In contrast, as a result of the determination, when the temperature of the electric power transmission unit 3 does not become higher than the first temperature threshold (or when the temperature of the electric power transmission unit 3 does not become not lower than the first temperature threshold) (No), the normal electric power feeding control unit 11 returns the processing to process S11. As a result, when the temperature of the electric power transmission unit 3 measured by the temperature measurement unit 2 in process S13 does not become higher than the first temperature threshold (or when the temperature of the electric power transmission unit 3 does not become not lower than the first temperature threshold), the electric power feeding is continued.

In contrast, in process S15 described above, the in-vehicle wireless electric power feeding device SD causes the normal electric power feeding control unit 11 to stop the electric power feeding by the electric power transmission unit 3. As a result, the temperature rise in the electric power transmission unit 3 peaks out and then the temperature of the electric power transmission unit 3 drops.

Following process S15 described above, the in-vehicle wireless electric power feeding device SD causes the normal electric power feeding control unit 11 to measure the temperature of the electric power transmission unit 3 via the temperature measurement unit 2 as in process S13 described above (S16). In process S16 as well, as in process S13 described above, the normal electric power feeding control unit 11 may measure the temperature of the electric power transmission unit 3 via the temperature measurement unit 2 after executing the weight process.

Following process S16 described above, the in-vehicle wireless electric power feeding device SD causes the normal electric power feeding control unit 11 to determine whether the temperature of the electric power transmission unit 3 measured by the temperature measurement unit 2 in process S16 becomes lower than the third temperature threshold (or becomes not higher than the third temperature threshold) (S17). As a result of this determination, when the temperature of the electric power transmission unit 3 is lower than the third temperature threshold (or when the temperature of the electric power transmission unit 3 is not higher than the third temperature threshold) (Yes), the normal electric power feeding control unit 11 then returns the processing to process S11. As a result, when the temperature of the electric power transmission unit 3 measured by the temperature measurement unit 2 in process S16 becomes lower than the third temperature threshold (or the temperature of the electric power transmission unit 3 becomes not higher than the third temperature threshold), the electric power feeding having been stopped due to the temperature of the electric power transmission unit 3 even though the electric power feeding is required is resumed and the electric power feeding is performed. In contrast, as a result of the determination, when the temperature of the electric power transmission unit 3 does not become lower than the third temperature threshold (or when the temperature of the electric power transmission unit 3 does not become not higher than the third temperature threshold) (No), the normal electric power feeding control unit 11 returns the processing to process S16. As a result, process S16 and process S17 are repeated until the temperature of the electric power transmission unit 3 becomes lower than the third temperature threshold.

In contrast, in process S21 described above, according to the completion of electric power feeding determined in process S12, the in-vehicle wireless electric power feeding device SD controls the electric power transmission unit 3 to stop electric power feeding via the normal electric power feeding control unit 11. As a result, the electric power feeding is stopped.

Following process S21 described above, the in-vehicle wireless electric power feeding device SD causes the normal electric power feeding control unit 11 to determine whether an electric power feeding request has been received as in process S2 described above (S22). As a result of this determination, when the charge request signal has been received, the normal electric power feeding control unit 11 determines that the electric power feeding request is present (Yes) and then executes process S13. Accordingly, when a new electric power feeding request is received, electric power feeding is performed in the normal electric power feeding mode. In contrast, as a result of the determination, when the charge request signal has not been received, the normal electric power feeding control unit 11 determines that the electric power feeding request is not present (No) and then executes process S23.

In process S23, the in-vehicle wireless electric power feeding device SD causes the control unit 1 to determine whether the operation is completed. When the operation is completed (Yes) as a result of this determination, the control unit 1 completes this process. In contrast, when the operation is not completed (No) as a result of the determination, the control unit 1 returns the processing to process S22. As a result, process S22 and process S23 are repeated until a new electric power feeding request is received. In the completion of operation, when, for example, the operation of the passenger vehicle VC is completed by parking or the like, the operation of the in-vehicle wireless electric power feeding device SD is completed accordingly. It should be noted here that, when the operation is completed during the execution of processes S11 to S17, this process is completed by, for example, interrupt processing.

By executing the process in the normal electric power feeding mode as described above, the normal electric power feeding control unit 11 controls the electric power transmission unit 3 so that the electric power transmission unit 3 starts electric power feeding when the temperature measured by the temperature measurement unit 2 at the start of the electric power feeding is not higher than the first temperature threshold (or lower than the first temperature threshold), controls the electric power transmission unit 3 so that the electric power transmission unit 3 stops the electric power feeding when the temperature measured by the temperature measurement unit 2 during the electric power feeding becomes higher than the first temperature threshold (or becomes not lower than the first temperature threshold), and controls the electric power transmission unit 3 so that the electric power transmission unit 3 starts (resumes) the electric power feeding when the temperature measured by the temperature measurement unit 2 becomes lower than the preset predetermined third temperature threshold lower than the first temperature threshold (or becomes not higher than the third temperature threshold) while the electric power feeding stops even if the electric power feeding is required.

Next, process S6 in the startup time electric power feeding mode will be described.

In process S6 in this startup time electric power feeding mode, in FIG. 4, the in-vehicle wireless electric power feeding device SD first causes the startup time electric power feeding control unit 12 of the control unit 1 to determine whether the temperature of the electric power transmission unit 3 measured by the temperature measurement unit 2 in process S3 is higher than the second temperature threshold (or not lower than the second temperature threshold) (S31). As a result of this determination, when the temperature of the electric power transmission unit 3 is higher than the second temperature threshold (or when the temperature of the electric power transmission unit 3 is not lower than the second temperature threshold) (Yes), the startup time electric power feeding control unit 12 then executes process S13 described above in FIG. 3 (S37). As a result, the process in the startup time electric power feeding mode is completed and then the process in the normal electric power feeding mode is executed. In contrast, as a result of the determination, when the temperature of the electric power transmission unit 3 does not become higher than the second temperature threshold (or when the temperature of the electric power transmission unit 3 does not become not lower than the second temperature threshold) (No), the startup time electric power feeding control unit 12 then executes process S32.

In process S32, the in-vehicle wireless electric power feeding device SD controls the electric power transmission unit 3 so that the electric power transmission unit 3 wirelessly performs electric power feeding to the smartphone RD with the electric power value that is based on the difference between the second temperature threshold and the temperature measured by the temperature measurement unit 2 in process S3 via the startup time electric power feeding control unit 12. As a result, the electric power transmission unit 3 wirelessly performs electric power feeding to the smartphone RD. For example, when the second temperature threshold is set to 85° C. and the temperature measured by temperature measurement unit 2 in process S3 is 55° C., the electric power transmission unit 3 is controlled so that the electric power transmission unit 3 performs electric power feeding with an electric power value of 4 W, which is associated in advance with the difference 30° C. therebetween. When the temperature measured by the temperature measurement unit 2 in process S3 is, for example, 70° C., the electric power transmission unit 3 is controlled so that the electric power transmission unit 3 performs electric power feeding with an electric power value of 2 W, which is associated in advance with the difference 15° C. therebetween. As described above, the startup time electric power feeding control unit 12 sets the electric power value that is based on the difference so that the smaller the difference, the smaller the electric power value.

Following process S32 described above, the in-vehicle wireless electric power feeding device SD causes the startup time electric power feeding control unit 12 to determine whether the completion of electric power feeding has been received as in process S12 (S33). As a result of this determination, when the charging completion signal has been received, the startup time electric power feeding control unit 12 determines that the completion of electric power feeding is present (Yes) and then executes process S41. In contrast, as a result of the determination, when the charging completion signal has not been received, the startup time electric power feeding control unit 12 determines that the completion of electric power feeding is not present (No) and then executes process S34.

In process S34, the in-vehicle wireless electric power feeding device SD causes the startup time electric power feeding control unit 12 to measure the temperature of the electric power transmission unit 3 via the temperature measurement unit 2 as in process S13. In process S34 as well, as in process S13 described above, the startup time electric power feeding control unit 12 may measure the temperature of the electric power transmission unit 3 via the temperature measurement unit 2 after executing the wait process.

Following process S34 described above, the in-vehicle wireless electric power feeding device SD causes the startup time electric power feeding control unit 12 to determine whether the temperature of the electric power transmission unit 3 measured by the temperature measurement unit 2 in process S34 becomes lower than the third temperature threshold (or not higher than the third temperature threshold) (S35). As a result of this determination, when the temperature of the electric power transmission unit 3 becomes lower than the third temperature threshold (or when the temperature of the electric power transmission unit 3 becomes not higher than the third temperature threshold) (Yes), the startup time electric power feeding control unit 12 then changes the electric power value that is based on the difference to the electric power value of charging (electric power value of electric power feeding) contained in the charge request signal, and then executes process S11 described above in FIG. 3 (S36). As a result, when the temperature of the electric power transmission unit 3 measured by the temperature measurement unit 2 in process S34 becomes lower than the third temperature threshold (or when the temperature of the electric power transmission unit 3 becomes not higher than the third temperature threshold), the process in the startup time electric power feeding mode is completed and the process in the normal electric power feeding mode is executed. In contrast, as a result of the determination, when the temperature of the electric power transmission unit 3 does not become lower than the third temperature threshold (or when the temperature of the electric power transmission unit 3 does not become not higher than the third temperature threshold) (No), the startup time electric power feeding control unit 12 returns the processing to process S32. As a result, processes S32 to S35 are repeated until the temperature of the electric power transmission unit 3 becomes lower than the third temperature threshold.

In contrast, in process S41 described above, according to the completion of electric power feeding determined in process S33, the in-vehicle wireless electric power feeding device SD controls the electric power transmission unit 3 so that the electric power transmission unit 3 stops the electric power feeding via the startup time electric power feeding control unit 12. As a result, the electric power feeding is stopped.

Following process S41 described above, the in-vehicle wireless electric power feeding device SD causes the startup time electric power feeding control unit 12 to determine whether an electric power feeding request has been received (S42) as in process S2 described above. As a result of this determination, when the charge request signal has been received, the startup time electric power feeding control unit 12 determines that the electric power feeding request is present (Yes) and then executes process S37. Accordingly, when a new electric power feeding request has been received, electric power feeding is performed in the normal electric power feeding mode. It should be noted here that, as illustrated by the dotted line, process S31 may be executed next to execute electric power feeding in the startup time electric power feeding mode. In contrast, as a result of the determination, when the charge request signal has not been received, the startup time electric power feeding control unit 12 determines that the electric power feeding request is not present (No) and then executes process S43.

In process S43, the in-vehicle wireless electric power feeding device SD causes the control unit 1 to determine whether the operation is completed. When the operation is completed (Yes) as a result of this determination, the control unit 1 completes this process. In contrast, when the operation is not completed (No) as a result of the determination, the control unit 1 returns the processing to process S42. As a result, process S42 and process S43 are repeated until a new electric power feeding request is received. It should be noted here that, when the operation of the passenger vehicle VC is completed during the execution of processes S31 to S36, this process is completed by, for example, interrupt processing.

By executing the process in the startup time electric power feeding mode as described above, the startup time electric power feeding control unit 12 controls the electric power transmission unit 3 so that the electric power transmission unit 3 wirelessly performs electric power feeding to the smartphone RD when the temperature measured by the temperature measurement unit 2 at the start of the in-vehicle wireless electric power feeding device SD is not higher than the second temperature threshold (or lower than the second temperature threshold) and controls the electric power transmission unit 3 so that the electric power transmission unit 3 does not wirelessly perform electric power feeding to the smartphone RD when the temperature measured by the temperature measurement unit 2 at the startup is higher than the second temperature threshold (or not lower than the second temperature threshold).

Figure 5:
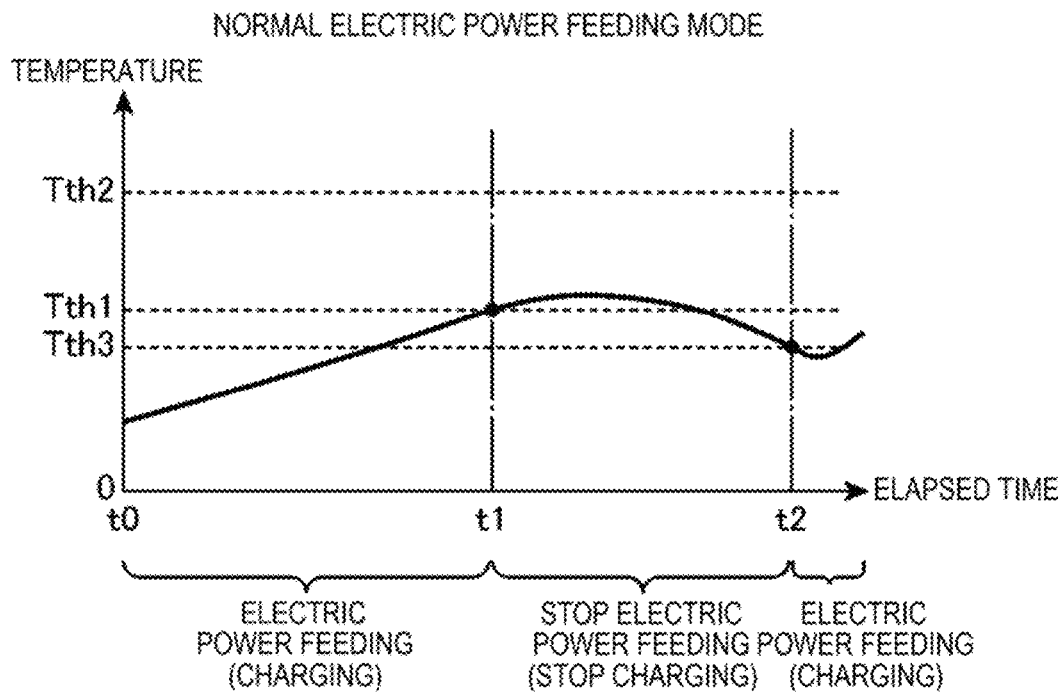
FIG. 5 is a diagram illustrating, as one example, temperature changes in the in-vehicle wireless electric power feeding device with respect to the elapsed time after startup in the normal electric power feeding mode.
Figure 6:
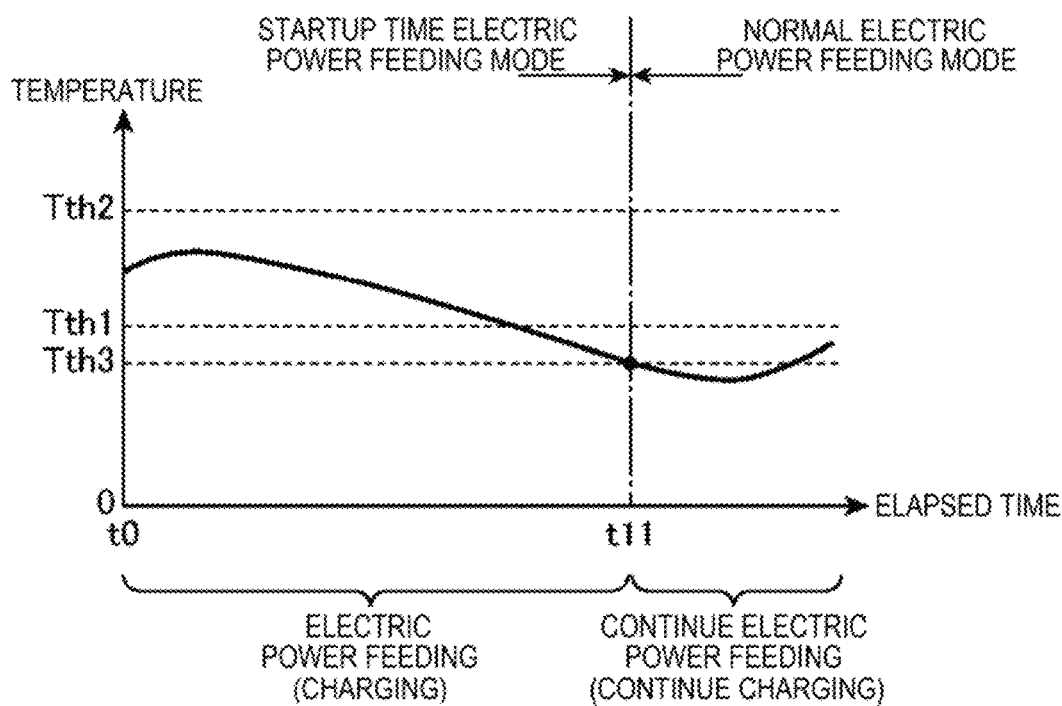
FIG. 6 is a diagram illustrating, as one example, temperature changes in the in-vehicle wireless electric power feeding device with respect to the elapsed time after startup in the startup time electric power feeding mode.
Figure 7:
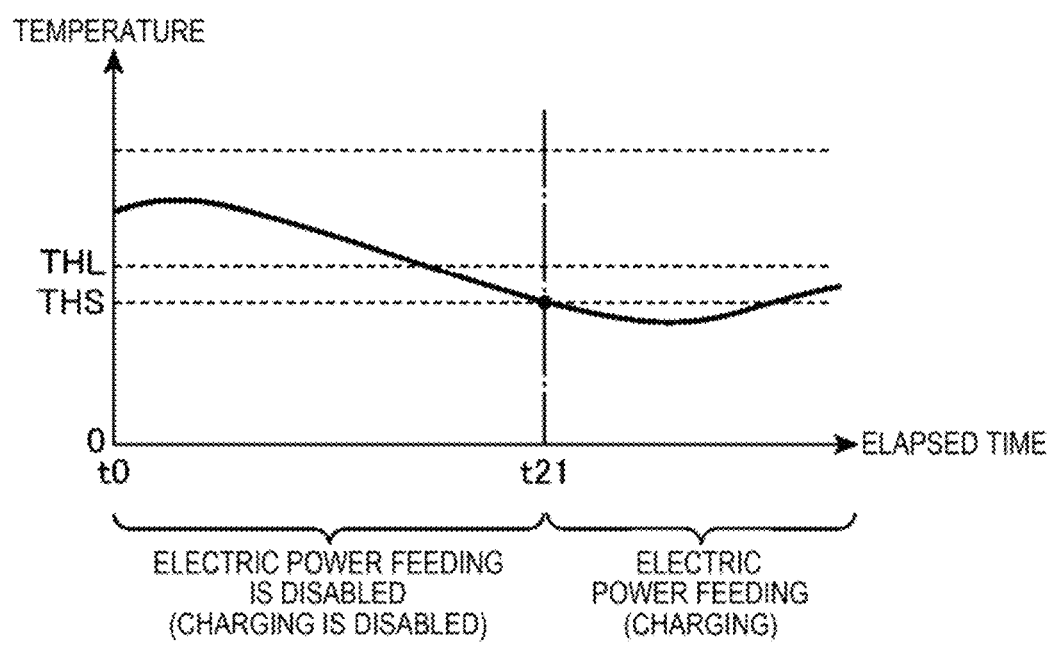
FIG. 7 is a diagram illustrating, as a comparative example, temperature changes in an in-vehicle wireless electric power feeding device according to the comparative example not having the startup time electric power feeding mode with respect to the elapsed time after startup.

The operation of the normal electric power feeding mode and the operation of the startup time electric power feeding mode will be described more specifically by giving one example together with the comparative example. FIG. 5 is a diagram illustrating, as one example, temperature changes in the in-vehicle wireless electric power feeding device with respect to the elapsed time after startup in the normal electric power feeding mode. FIG. 6 is a diagram illustrating, as one example, temperature changes in the in-vehicle wireless electric power feeding device with respect to the elapsed time after startup in the startup time electric power feeding mode. FIG. 7 is a diagram illustrating, as a comparative example, temperature changes in an in-vehicle wireless electric power feeding device according to the comparative example not having the startup time electric power feeding mode with respect to the elapsed time after startup in the in-vehicle wireless electric power feeding device according to the comparative example. The horizontal axes of FIGS. 5 to 7 represent the elapsed time from a startup timing t0 and the vertical axes represent the temperature of the in-vehicle wireless electric power feeding device SD. The in-vehicle wireless electric power feeding device according to the comparative example does not have the startup time electric power feeding mode and stops the electric power feeding at a temperature not lower than or higher than the predetermined first temperature threshold. The first to third temperature thresholds in the in-vehicle wireless electric power feeding device SD according to the embodiment are a temperature Tth1, a temperature Tth2, and a temperature Tth3, respectively. The first and third temperature thresholds in the in-vehicle wireless electric power feeding device SD according to the comparative example are a temperature THL and a temperature THS, respectively. Here, the temperature Tth1 and the temperature THL have the same value and the temperature Tth3 and the temperature THS have the same value.

In FIG. 5, when the temperature of the electric power transmission unit 3 at the startup timing t0 is not higher than the first temperature threshold Tth1, processes S1 to S4 are executed and then process S5 in the normal electric power feeding mode is executed in FIG. 2. Accordingly, process S11 is executed and the in-vehicle wireless electric power feeding device SD starts electric power feeding in FIG. 3, and this electric power feeding causes the temperature of the electric power transmission unit 3 to start raising as illustrated in FIG. 5. While this in-vehicle wireless electric power feeding device SD performs electric power feeding and the temperature of the electric power transmission unit 3 rises, when processes S11 to S14 are repeatedly executed and the temperature of the electric power transmission unit 3 at an elapsed time t1 becomes higher than the first temperature threshold Tth1, process S15 is executed and the in-vehicle wireless electric power feeding device SD stops the electric power feeding. Next, the processes S16 and S17 are repeatedly executed, the temperature rise in the electric power transmission unit 3 peaks out as illustrated in FIG. 5 because the electric power feeding stops, and then the temperature of the electric power transmission unit 3 drops. When the processes S16 and S17 are repeatedly executed as described above and the temperature of the electric power transmission unit 3 is lower than the third temperature threshold Tth3 at an elapsed time t2 as illustrated in FIG. 5, process S11 is executed, electric power feeding is resumed, and this electric power feeding causes the temperature of the electric power transmission unit 3 to start raising as illustrated in FIG. 5. After that, the individual processes are executed as described above until the completion of electric power feeding is received.

In contrast, when the temperature of the electric power transmission unit 3 at the startup timing t0 is higher than the first temperature threshold Tth1 in FIG. 6, processes S1 to S4 are executed and then process S6 in the startup time electric power feeding mode is executed in FIG. 2. Accordingly, in FIG. 4, process S31 is executed, process S32 is executed when the temperature of the electric power transmission unit 3 at the startup timing t0 is not higher than the second temperature threshold Tth2, and the in-vehicle wireless electric power feeding device SD starts electric power feeding with the electric power value that is based on the difference between the second temperature threshold Tth2 and the temperature of the electric power transmission unit 3 at the startup timing to. In addition, this electric power feeding causes the temperature of the electric power transmission unit 3 to start raising in FIG. 6. While the in-vehicle wireless electric power feeding device SD performs electric power feeding, processes S32 to S35 are repeatedly executed. When the temperature inside the passenger vehicle VC drops due to the intake of outside air into the passenger vehicle VC or the operation of an air conditioner, the temperature of the electric power transmission unit 3 also starts dropping accordingly as illustrated in FIG. 6. Then, when the temperature of the electric power transmission unit 3 becomes lower than the third temperature threshold Tth3 at an elapsed time t1/, process S36 is executed, the startup time electric power feeding mode is completed, the normal electric power feeding mode is executed, and electric power feeding is continued as illustrated in FIG. 6. After that, the individual processes are executed as described above until the completion of the electric power feeding is received in the normal electric power feeding mode. As described above, in the startup time electric power feeding mode, even when the temperature of the electric power transmission unit 3 at startup is higher than the first temperature threshold Tth1, electric power feeding is started at the startup timing t0 when the temperature is not higher than the second temperature threshold Tth2.

In contrast, in the in-vehicle wireless electric power feeding device according to the comparative example, when the temperature of the electric power transmission unit 3 at startup is higher than the first temperature threshold Tth1, electric power feeding is not started until an elapsed time t21 when the temperature of the electric power transmission unit 3 becomes lower than the third temperature threshold Tth3, as illustrated in FIG. 7.

Accordingly, the in-vehicle wireless electric power feeding device SD according to the embodiment can improve the opportunity for electric power feeding at startup as compared with the in-vehicle wireless electric power feeding device according to the comparative example.

Normally, the first temperature threshold is set to a temperature at or above which a person feels hot to ensure human safety and is set lower than the guaranteed operating temperature under which the operation of the in-vehicle wireless electric power feeding device SD is guaranteed. Accordingly, electric power feeding can be performed even at a temperature not lower than the first temperature threshold. Then, when the vehicle is parked in an environment in which the temperature rises, since the occupant empirically recognizes (predicts) that the vehicle is hot in starting the vehicle and the smartphone (electric power reception device) RD is placed on the in-vehicle wireless electric power feeding device SD based on the recognition, it is thought that the electric power feeding may be performed at a temperature not lower than the first temperature threshold. Since the in-vehicle wireless electric power feeding device SD according to the embodiment and the vehicle wireless electric power feeding method implemented therein control the electric power transmission unit 3 so that the electric power transmission unit 3 wirelessly performs electric power feeding to the smartphone (electric power reception device) RD when the temperature measured by the temperature measurement unit 2 at startup is not higher than or lower than the predetermined second temperature threshold higher than the first temperature threshold by taking advantage of this circumstance, the opportunity for electric power feeding can be improved at the startup of the in-vehicle wireless electric power feeding device SD.

Since the in-vehicle wireless electric power feeding device SD and the vehicle wireless electric power feeding method described above control the electric power transmission unit 3 so that the electric power transmission unit 3 does not wirelessly perform electric power feeding to the smartphone RD (one example of the electric power reception device) when the temperature measured by the temperature measurement unit 2 at startup is higher than or not lower than the second temperature threshold, the device and the method can be used appropriately.

The in-vehicle wireless electric power feeding device SD and the vehicle wireless electric power feeding method described above can perform electric power feeding appropriately under the guaranteed operation because the second temperature threshold is the guaranteed operating temperature that guarantees the operation of the in-vehicle wireless electric power feeding device SD.

Generally, the temperature of the in-vehicle wireless electric power feeding device is raised by wireless electric power feeding and the rate of the temperature rise per unit time depends on the magnitude of the electric power value of the electric power feeding. Since the in-vehicle wireless electric power feeding device SD and the vehicle wireless electric power feeding method control the electric power transmission unit 3 so that the electric power transmission unit 3 wirelessly performs electric power feeding to the smartphone RD with the electric power value that is based on the difference between the second temperature threshold and the temperature measured by the temperature measurement unit 2, the electric power feeding time can be further prolonged and the amount of electric power feeding can be further increased.

In the embodiment described above, when the temperature measured by the temperature measurement unit 2 at startup is higher than or not lower than the second temperature threshold, the in-vehicle wireless electric power feeding device SD may control the electric power transmission unit 3 so that the electric power transmission unit 3 does not perform electric power feeding to the smartphone RD. In addition, after a transition from the startup time electric power feeding mode to the normal electric power feeding mode is made, when the temperature inside the vehicle drops due to the intake of outside air into the vehicle and the operation of an air conditioner and the temperature measured by the temperature measurement unit 2 becomes lower than the second temperature threshold, the in-vehicle wireless electric power feeding device SD may control the electric power transmission unit 3 so that the electric power transmission unit 3 wirelessly performs electric power feeding to the smartphone RD.

More specifically, the control unit 1 controls the electric power transmission unit 3 so that the electric power transmission unit 3 wirelessly performs electric power feeding to the electric power reception device (here, the smartphone RD as one example thereof) when the temperature measured by the temperature measurement unit 2 at the start of electric power feeding is not higher than or lower than the second temperature threshold until the temperature measured by the temperature measurement unit 2 after startup becomes lower than or not higher than the first temperature threshold for the first time. If the control unit 1 starts electric power feeding when the temperature measured by the temperature measurement unit 2 is near the second temperature threshold or less, the temperature measured by temperature measurement unit 2 becomes higher than the second temperature threshold in a short time due to a temperature rise. Accordingly, the control unit 1 causes the startup time electric power feeding control unit 12 to control the electric power transmission unit 3 so that the electric power transmission unit 3 wirelessly performs electric power feeding to the electric power reception device (smartphone RD as one example thereof) when the temperature measured by the temperature measurement unit 2 is not higher than or lower than a preset predetermined fourth temperature threshold that is lower than the second temperature threshold and higher than the first temperature threshold ((second temperature threshold) >((fourth temperature threshold)>(first temperature threshold)>(third temperature threshold)).

Figure 8:
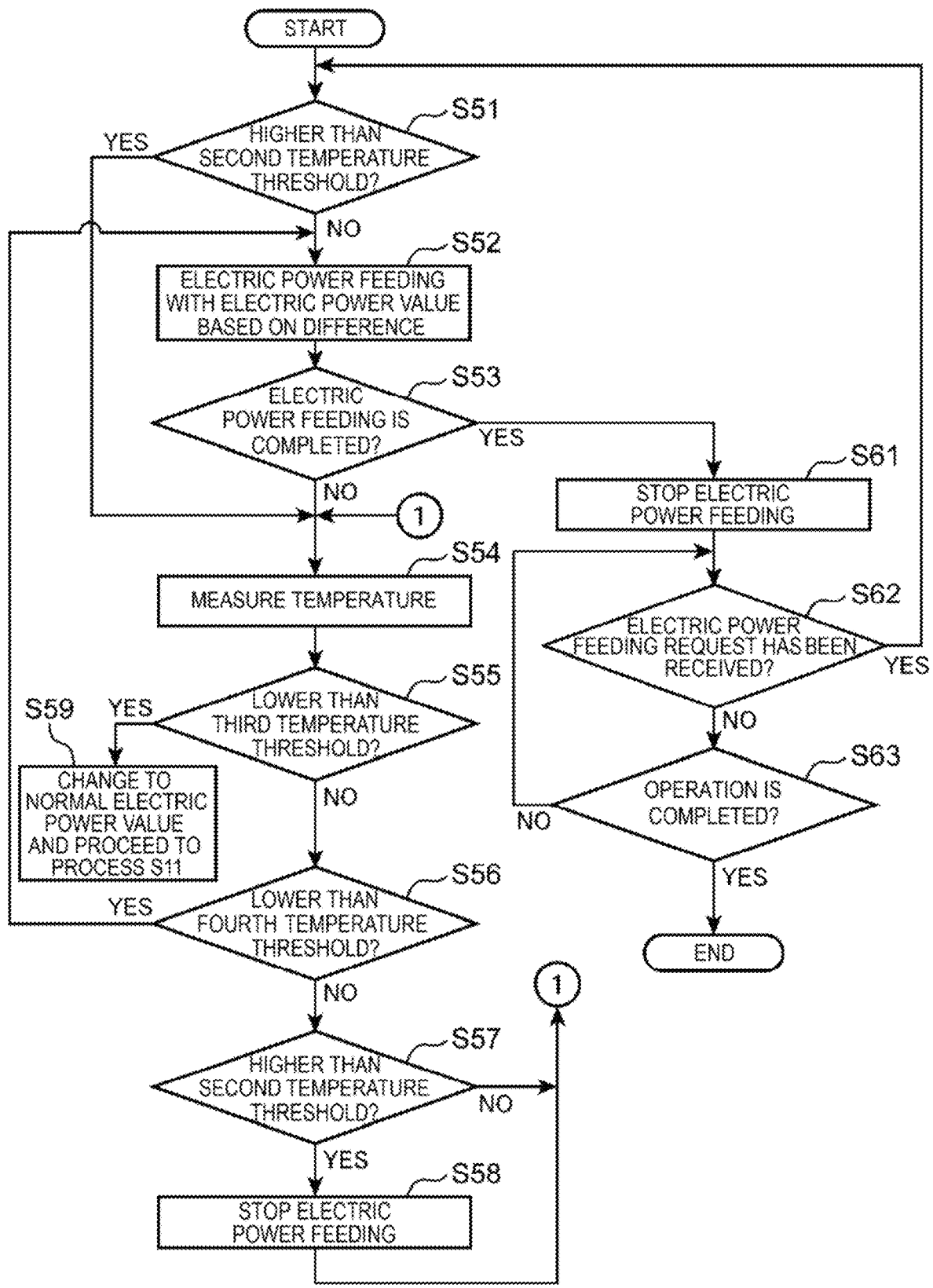
FIG. 8 is a flowchart illustrating the process in the startup time electric power feeding mode according to a modification.

In the modification described above, the in-vehicle wireless electric power feeding device SD operates as described below. FIG. 8 is a flowchart illustrating the process in the startup time electric power feeding mode according to the modification.

In process S6 in startup time electric power feeding mode according to the modification, in FIG. 8, the in-vehicle wireless electric power feeding device SD causes the startup time electric power feeding control unit 12 to determine whether the temperature of the electric power transmission unit 3 measured by the temperature measurement unit 2 in process S3 is higher than the second temperature threshold (or not lower than the second temperature threshold) (S51). As a result of this determination, when the temperature of the electric power transmission unit 3 is higher than the second temperature threshold (or when the temperature of the electric power transmission unit 3 is not lower than the second temperature threshold) (Yes), the startup time electric power feeding control unit 12 then executes process S54. In contrast, as a result of the determination, when the temperature of the electric power transmission unit 3 does not become higher than the second temperature threshold (or when the temperature of the electric power transmission unit 3 does not become not lower than the second temperature threshold) (No), the startup time electric power feeding control unit 12 then executes process S52.

In process S52, the in-vehicle wireless electric power feeding device SD causes the startup time electric power feeding control unit 12 to control the electric power transmission unit 3 so that the electric power transmission unit 3 wirelessly performs electric power feeding to the smartphone RD with the electric power value that is based on the difference between the second temperature threshold and the temperature measured by the temperature measurement unit 2 in process S3 as in process S32 described above. As a result, the electric power transmission unit 3 wirelessly performs electric power feeding to the smartphone RD.

Following process S52 described above, the in-vehicle wireless electric power feeding device SD causes the startup time electric power feeding control unit 12 to determine whether the completion of electric power feeding has been received as in process S12 described above (S53). As a result of this determination, when the charging completion signal has been received, the startup time electric power feeding control unit 12 determines that the completion of electric power feeding is present (Yes) and then executes process S61. In contrast, as a result of the determination, when the charging completion signal has not been received, the startup time electric power feeding control unit 12 determines that the completion of electric power feeding is not present (No) and then executes process S54.

In process S54, the in-vehicle wireless electric power feeding device SD causes the startup time electric power feeding control unit 12 to measure the temperature of the electric power transmission unit 3 via the temperature measurement unit 2 as in process S13. In process S54 as well, as in process S13 described above, the startup time electric power feeding control unit 12 may measure the temperature of the electric power transmission unit 3 via the temperature measurement unit 2 after executing the wait process.

Following process S54 described above, the in-vehicle wireless electric power feeding device SD causes the startup time electric power feeding control unit 12 to determine whether the temperature of the electric power transmission unit 3 measured by the temperature measurement unit 2 in process S54 becomes lower than the third temperature threshold (or becomes not higher than the third temperature threshold) (S55). As a result of this determination, when the temperature of the electric power transmission unit 3 becomes lower than the third temperature threshold (or when the temperature of the electric power transmission unit 3 becomes not higher than the third temperature threshold) (Yes), the startup time electric power feeding control unit 12 changes the electric power value that is based on the difference to the electric power value of charging (the electric power value of electric power feeding) contained in the charge request signal and then executes process S11 described above in FIG. 3 (S59). As a result, when the temperature of the electric power transmission unit 3 measured by the temperature measurement unit 2 in process S54 becomes lower than the third temperature threshold (or when the temperature of the electric power transmission unit 3 becomes not higher than the third temperature threshold), the process in the startup time electric power feeding mode is completed and the process in the normal electric power feeding mode is executed. In contrast, as a result of the determination described above, when the temperature of the electric power transmission unit 3 does not become lower than the third temperature threshold (or when the temperature of the electric power transmission unit 3 does not become not higher than the third temperature threshold) (No), the startup time electric power feeding control unit 12 then executes process S56.

In process S56, the in-vehicle wireless electric power feeding device SD causes the startup time electric power feeding control unit 12 to determine whether the temperature of the electric power transmission unit 3 measured by the temperature measurement unit 2 in process S54 becomes lower than the fourth temperature threshold (or becomes not higher than the fourth temperature threshold). As a result of this determination, when the temperature of the electric power transmission unit 3 becomes lower than the fourth temperature threshold (or when the temperature of the electric power transmission unit 3 becomes not higher than the fourth temperature threshold) (Yes), the startup time electric power feeding control unit 12 returns the processing to process S52. As a result, the electric power transmission unit 3 wirelessly performs electric power feeding to the smartphone RD with the electric power value that is based on the difference described above. In contrast, as a result of the determination, when the temperature of the electric power transmission unit 3 does not become lower than the fourth temperature threshold (or when the temperature of the electric power transmission unit 3 does not become not higher than the fourth temperature threshold) (No), the startup time electric power feeding control unit 12 then executes process S57.

In process S57, the in-vehicle wireless electric power feeding device SD causes the startup time electric power feeding control unit 12 to determine whether the temperature of the electric power transmission unit 3 measured by the temperature measurement unit 2 in process S54 becomes higher than the second temperature threshold (or becomes not lower than the second temperature threshold). As a result of this determination, when the temperature of the electric power transmission unit 3 becomes higher than the second temperature threshold (or when the temperature of the electric power transmission unit 3 becomes not lower than the second temperature threshold) (Yes), the startup time electric power feeding control unit 12 controls the electric power transmission unit 3 so that the electric power transmission unit 3 stops the electric power feeding (stop power feeding in S58) and then returns the processing to process S54. In contrast, as a result of the determination, when the temperature of the electric power transmission unit 3 does not become higher than the second temperature threshold (or when the temperature of the electric power transmission unit 3 does not become not lower than the second temperature threshold) (No), the startup time electric power feeding control unit 12 returns the processing to process S54.

In contrast, in process S61 described above, according to the completion of electric power feeding determined in process S53, the in-vehicle wireless electric power feeding device SD causes the startup time electric power feeding control unit 12 to control the electric power transmission unit 3 so that the electric power transmission unit 3 stops electric power feeding. As a result, the electric power feeding is stopped.

Following process S61 described above, the in-vehicle wireless electric power feeding device SD causes the startup time electric power feeding control unit 12 to determine whether an electric power feeding request has been received (S62) as in process S2 described above. As a result of this determination, when the charge request signal has been received, the startup time electric power feeding control unit 12 determines that the electric power feeding request is present (Yes) and then executes process S51. Accordingly, when a new electric power feeding request is received, electric power feeding is performed in the startup time electric power feeding mode. In contrast, as a result of the determination, when the charge request signal has not been received, the startup time electric power feeding control unit 12 determines that the electric power feeding request is not present (No) and then executes process S63.

In process S63, the in-vehicle wireless electric power feeding device SD causes the control unit 1 to determine whether the operation is completed. When the operation is completed (Yes) as a result of this determination, the control unit 1 completes this process. In contrast, when the operation is not completed (No) as a result of the determination, the control unit 1 returns the processing to process S62. As a result, process S62 and process S63 are repeated until a new electric power feeding request is received. It should be noted here that, when the operation of the passenger vehicle VC is completed during the execution of processes S51 to S59, this process is completed by, for example, interrupt processing.

For example, when the temperature of the electric power transmission unit 3 at startup is higher than the first temperature threshold, processes S1 to S4 are executed in FIG. 2, and then process S6 in the startup time electric power feeding mode is executed. Accordingly, process S51 is executed in FIG. 8, process S54 is executed when the temperature of the electric power transmission unit 3 at the startup is higher than the second temperature threshold, and processes S54 to S58 are repeated until the temperature of the electric power transmission unit 3 becomes lower than the fourth temperature threshold (or becomes not higher than the fourth temperature threshold). When the temperature of the electric power transmission unit 3 becomes lower than the fourth temperature threshold (or becomes not higher than the fourth temperature threshold), process S52 is executed from process S56 and electric power feeding is performed with the electric power value that is based on the difference. After that, for example, before the completion of the electric power feeding, when the temperature of the electric power transmission unit 3 becomes lower than the third temperature threshold (or becomes not higher than the third temperature threshold), process S11 is executed from process S55 and the startup time electric power feeding mode shifts to the normal electric power feeding mode. Alternatively, after that, when, for example, the temperature of the electric power transmission unit 3 becomes higher than the second temperature threshold (or becomes not lower than the second temperature threshold) again before the completion of electric power feeding, process S58 is executed from process S57, the electric power feeding is stopped, the processing is returned to process S54, and processes S54 to S58 are repeated until the temperature of the electric power transmission unit 3 becomes lower than the fourth temperature threshold (or becomes not higher than the fourth temperature threshold) again.

By executing the process in the startup time electric power feeding mode according to the modification, the startup time electric power feeding control unit 12 controls the electric power transmission unit 3 so that the electric power transmission unit 3 wirelessly performs electric power feeding to the smartphone RD when the temperature measured by the temperature measurement unit 2 at the startup of the in-vehicle wireless electric power feeding device SD is not higher than the second temperature threshold (or lower than the second temperature threshold) and controls the electric power transmission unit 3 so that the electric power transmission unit 3 does not wirelessly perform electric power feeding to the smartphone RD when the temperature measured by the temperature measurement unit 2 at the startup is higher than the second temperature threshold (or not lower than the second temperature threshold). In addition, in the modification, the startup time electric power feeding control unit 12 further controls the electric power transmission unit 3 so that the electric power transmission unit 3 wirelessly performs electric power feeding to the smartphone RD when the temperature measured by the temperature measurement unit 2 at the start of electric power feeding is not higher than the second temperature threshold (the fourth temperature threshold in the above description) (or lower than the second temperature threshold (the fourth temperature threshold in the above description)) until the temperature measured by the temperature measurement unit 2 after startup becomes lower than the first temperature threshold for the first time (or becomes not higher than the first temperature threshold for the first time).

The present disclosure has been appropriately and sufficiently described above through embodiments with reference to the drawings to express the present disclosure, but it should be recognized that those skilled in the art can easily change and/or improve the above embodiment. Accordingly, modifications or improvements achieved by those skilled in the art are included in the scope of rights of the claims unless the modifications or improvements fall outside the scope of rights of the present disclosure described in the claims.

What is claimed is:

1. An in-vehicle wireless electric power feeding device that is used in a vehicle wirelessly performs electric power feeding to an electric power reception device and stops the electric power feeding at a temperature not lower than or higher than a predetermined first temperature threshold, the in-vehicle wireless electric power feeding device comprising:
    circuitry configured to
        wirelessly perform electric power feeding to the electric power reception device;
        measure a temperature of the electric power transmitter; and
        wirelessly perform the electric power feeding to the electric power reception device when the temperature measured by the temperature measurement device at startup is not higher than or lower than a predetermined second temperature threshold higher than the first temperature threshold,
    wherein, in response to wirelessly performing electric power feeding to the electric power reception device at the startup, the circuitry is configured to wirelessly perform electric power feeding to the electric power reception device with an electric power value that is based on a difference between the second temperature threshold and the temperature measured by the temperature measurement device.

2. The in-vehicle wireless electric power feeding device according to claim 1,
    wherein the circuitry does not wirelessly perform electric power feeding to the electric power reception device when the measured temperature at the startup is higher than or not lower than the predetermined second temperature threshold.

3. The in-vehicle wireless electric power feeding device according to claim 2,
wherein the second temperature threshold is an operating temperature under which an operation of the in-vehicle wireless electric power feeding device is guaranteed.

4. The in-vehicle wireless electric power feeding device according to claim 3,
wherein, in response to performing electric power feeding to the electric power reception device at the startup, the circuitry is configured to wirelessly perform electric power feeding to the electric power reception device with an electric power value that is based on a difference between the second temperature threshold and the measured temperature.

5. The in-vehicle wireless electric power feeding device according to claim 2,
wherein, in response to wirelessly performing electric power feeding to the electric power reception device at the startup, the circuitry is configured to wirelessly perform electric power feeding to the electric power reception device with an electric power value that is based on a difference between the second temperature threshold and the measured temperature.

6. The in-vehicle wireless electric power feeding device according to claim 1,
wherein the second temperature threshold is an operating temperature under which an operation of the in-vehicle wireless electric power feeding device is guaranteed.

7. The in-vehicle wireless electric power feeding device according to claim 6,
wherein, in response to wireless performing electric power feeding to the electric power reception device at the startup, the circuitry is configured to wirelessly perform electric power feeding to the electric power reception device with an electric power value that is based on a difference between the second temperature threshold and the measured temperature.

8. The in-vehicle wireless electric power feeding device according to claim 1,
wherein the electric power reception device is a smartphone.

9. The in-vehicle wireless electric power feeding device according to claim 1,
wherein an electric power transmitter configured to wirelessly perform electric power feeding to the electric power reception device is positioned on a bottom of a recess of an accessory case provided in a center console disposed between a driver's seat and a passenger's seat.

10. The in-vehicle wireless electric power feeding device according to claim 1,
wherein the circuitry is configured to perform a normal electric power feeding mode, wherein the circuitry for performing the normal electric power feeding mode is configured to
wirelessly perform electric power feeding to a smartphone and stop the electric power feeding at a temperature not lower than a preset predetermined first temperature threshold or higher than the preset predetermined first temperature threshold.

11. The in-vehicle wireless electric power feeding device according to claim 10,
wherein the circuitry for performing the normal electric power feeding mode is further configured to
start the electric power feeding when the measured temperature at the start of electric power feeding is not higher or lower than the first temperature threshold,
stop the electric power feeding when the measured temperature during the electric power feeding becomes higher or lower than the first temperature threshold, and
resume the electric power feeding when the measured temperature while the electric power feeding is stopped becomes lower than a predetermined third temperature threshold, wherein the predetermined third temperature threshold is lower than the first temperature threshold.

12. The in-vehicle wireless electric power feeding device according to claim 1,
wherein the second temperature threshold is a predetermined temperature within a range of 85 degrees Celsius and 100 degrees Celsius.

13. The in-vehicle wireless electric power feeding device according to claim 1,
wherein the first temperature threshold is a predetermined temperature within a range of 45 degrees Celsius to 50 degrees Celsius.

14. The in-vehicle wireless electric power feeding device according to claim 12,
wherein the first temperature threshold is a predetermined temperature within a range of 45 degrees Celsius to 50 degrees Celsius.

15. The in-vehicle wireless electric power feeding device according to claim 1,
wherein the circuitry is configured to perform a startup time electric power feeding mode for wireless performing electric power feeding to a smartphone, wherein the circuitry for performing the startup time electric power feeding mode is configured to
wirelessly perform electric power feeding to the smartphone when the temperature measured by the temperature measurement device at the startup of the in-vehicle wireless electric power feeding device is not higher or lower than the second temperature threshold, wherein the second temperature threshold is higher than the first temperature threshold, and
does not wirelessly perform electric power feeding to the smartphone when the measured temperature at the startup is higher than the second temperature threshold or not lower than the second temperature threshold.

16. The in-vehicle wireless electric power feeding device according to claim 15,
wherein, in response to the electric power feeding to the smartphone being wirelessly performed at the startup, the circuitry is configured to
continue the electric power feeding after the measured temperature becomes lower than a third temperature threshold hold or not higher than the third temperature threshold during the electric power feeding, or
stop the electric power feeding when the measured temperature during the electric power feeding becomes higher than the first temperature threshold or becomes not lower than the first temperature threshold, and
resume the electric power feeding when the measured temperature becomes lower than the third temperature threshold which is lower than the first temperature threshold while the electric power feeding is stopped.

17. A vehicle wireless electric power feeding method that is used in a vehicle wirelessly performs electric power feeding to an electric power reception device and stops the electric power feeding at a temperature not lower than or higher than a predetermined first temperature threshold, the vehicle wireless electric power feeding method comprising:
- measuring a temperature of an electric power transmitter; and
- wirelessly performing electric power feeding to the electric power reception device when the temperature measured in the temperature measurement step at startup is not higher than or less than a predetermined second temperature threshold higher than the first temperature threshold,
- wherein the second temperature threshold is a predetermined temperature within a range of 85 degrees Celsius and 100 degrees Celsius,
- wherein the first temperature threshold is a predetermined temperature within a range of 45 degrees Celsius to 50 degrees Celsius.

18. An in-vehicle wireless electric power feeding device that is used in a vehicle wirelessly performs electric power feeding to an electric power reception device and stops the electric power feeding at a temperature not lower than or higher than a predetermined first temperature threshold, the in-vehicle wireless electric power feeding device comprising:
- an electric power transmitter configured to wirelessly perform electric power feeding to the electric power reception device;
- a temperature measurement device configured to measure a temperature of the electric power transmitter; and
- circuitry configured to control the electric power transmitter so that the electric power transmitter wirelessly performs electric power feeding to the electric power reception device when the temperature measured by the temperature measurement device at startup is not higher than or lower than a predetermined second temperature threshold higher than the first temperature threshold,
- wherein the circuitry is configured to perform a startup time electric power feeding mode for wireless performing electric power feeding to a smartphone, wherein the circuitry for performing the startup time electric power feeding mode is configured to
  - wirelessly perform electric power feeding to the smartphone when the temperature measured by the temperature measurement device at the startup of the in-vehicle wireless electric power feeding device is not higher or lower than the second temperature threshold, wherein the second temperature threshold is higher than the first temperature threshold, and
  - control the electric power transmitter so that the electric power transmitter does not wirelessly perform electric power feeding to the smartphone when the temperature measured by the temperature measurement device at the startup is higher than the second temperature threshold or not lower than the second temperature threshold,
- wherein, in response to the electric power feeding to the smartphone being wirelessly performed at the startup, the circuitry is configured to control the electric power transmitter so the electric power transmitter
  - continues the electric power feeding after the temperature measured by the temperature measurement device becomes lower than a third temperature threshold hold or not higher than the third temperature threshold during the electric power feeding, or
  - stops the electric power feeding when the temperature measured by the temperature measurement device during the electric power feeding becomes higher than the first temperature threshold or becomes not lower than the first temperature threshold, and
- controls the electric power transmitter so that the electric power transmitter resumes the electric power feeding when the temperature measured by the temperature measurement device becomes lower than the third temperature threshold which is lower than the first temperature threshold while the electric power feeding is stopped.

* * * * *